(12) United States Patent
Hwang et al.

(10) Patent No.: US 7,405,694 B1
(45) Date of Patent: Jul. 29, 2008

(54) COMMUNICATION LINK TIME TRANSFER TO IMPROVE NAVIGATION SYSTEM ACCURACY

(75) Inventors: Patrick Y. Hwang, Marion, IA (US); Bernard A. Schnaufer, Marion, IA (US); David A. Anderson, Hiawatha, IA (US); Gary A. McGraw, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 92 days.

(21) Appl. No.: 11/368,782

(22) Filed: Mar. 6, 2006

(51) Int. Cl.
*G01S 1/00* (2006.01)
*H04B 7/185* (2006.01)
*H04Q 7/20* (2006.01)

(52) U.S. Cl. .......................... 342/357.02; 342/357.03; 342/357.12; 455/456.1

(58) Field of Classification Search .............................. 342/357.01–357.17
See application file for complete search history.

(56) References Cited

U.S. PATENT DOCUMENTS

| | | | |
|---|---|---|---|
| 5,563,607 A * | 10/1996 | Loomis et al. | 342/357.03 |
| 5,590,043 A * | 12/1996 | McBurney | 701/207 |
| 5,702,070 A * | 12/1997 | Waid | 244/183 |
| 5,903,654 A * | 5/1999 | Milton et al. | 342/357.02 |
| 5,986,575 A * | 11/1999 | Jones et al. | 340/906 |
| 6,055,477 A * | 4/2000 | McBurney et al. | 701/207 |
| 6,243,026 B1* | 6/2001 | Jones et al. | 340/906 |
| 2003/0085839 A1* | 5/2003 | Zhodzishky et al. | 342/357.12 |
| 2005/0159170 A1* | 7/2005 | Puranik et al. | 455/456.1 |

OTHER PUBLICATIONS

"Adaptive Modeling of Receiver Clock for Meter-Level DGPS Vertical Positioning", by P. Misra et al., Proceedings of the Institute of Navigation GPS 1995, Palm Springs, CA, Sep. 1995.
"Differential GPS Reference Station Algorithm-Design and Analysis", J. Farrell et al., IEEE Transactions on Control Systems Technology, vol. 8, No. 3, May 2000.
"Atomic Clock Augmentation for Receivers Using the Global Positioning System" by Paul A. Kline, PhD Disseration, Virginia Polytechnic Institute and State University, Feb. 1997.

* cited by examiner

*Primary Examiner*—Thomas H. Tarcza
*Assistant Examiner*—Harry Liu
(74) *Attorney, Agent, or Firm*—Nathan O. Jensen; Kyle Eppele

(57) ABSTRACT

A method and apparatus for improving differential navigation accuracy uses time transfer over a two-way communications link. The communications link transmits an overall time offset between a differential reference station and a remote user. A differential navigation position solution is modified at the remote user with the overall time offset to improve the differential navigation accuracy. A first time offset between a first communications device and a first navigation receiver at the remote user is determined. A second time offset between the first communications device at the remote user and a second communications device at the differential reference station is determined. A third time offset between the second communications device and a second navigation receiver at the differential reference station is determined. An overall time offset from the first time offset, the second time offset, and the third time offset is computed and used to improve the differential navigation accuracy.

6 Claims, 9 Drawing Sheets

All-in-view DOP over CONUS

COMMUNICATION LINK TIME TRANSFER TO IMPROVE NAVIGATION SYSTEM ACCURACY

BACKGROUND OF THE INVENTION

This invention relates to navigation systems, Global Navigation Satellite Systems (GNSS), the Global Positioning System (GPS), and specifically to a method of using a two-way communications link to improve differential navigation system accuracy.

With few exceptions, GPS vertical accuracy is generally poorer than its horizontal accuracy. This is particularly acute at raised masked angles that constrict the visible sky and lead to clustering of the available satellites. A similar effect on horizontal accuracy is also found to be caused by clustering of satellites in a directional sense. For airborne applications that require vertical accuracy for guidance and control, but are saddled with operational environments of restricted satellite visibility, previous efforts have been focused primarily on lowering the range error or raising the number of ranging sources, both of which give only limited possibilities for performance improvement. Alternatively, there is much benefit to be garnered in reducing vertical dilution of precision (VDOP) itself.

Applications encountering poor VDOP will derive the most benefit. These applications include aircraft precision approach. Open sky generally yields good VDOP. However, heliports and tactical landing strips can sometimes be at locations with some restricted visibility. The flight critical nature of operation must consider satellite outages to determine service availability. Another application is automated aerial refueling where signal blockage can cause larger VDOP and HDOP (horizontal DOP) than in open sky visibility. Another application is for a MAV (miniature airborne vehicle) in urban operations where signal blockage in urban environments can have a severe impact on vertical positioning. Assisted GPS and E-911 applications in indoor environments where signal strength inside a building is very poor, so available signals are sparse and provide poor VDOP and HDOP, is another application.

A need exists for a simple, low-cost, method of time transfer to improve positioning accuracy, especially vertical, in differential navigation systems such as GPS. A robust method of time comparison that allows for non-trivial clock drift associated with low-cost frequency standards is needed.

SUMMARY OF THE INVENTION

A method of improving accuracy in a differential navigation system by time transfer with a two-way communications (comm) link comprises receiving navigation signals with a first navigation receiver to determine position of the first navigation receiver. A first time offset between a first navigation time mark from the first navigation receiver and a first comm time mark from a first comm device is determined. The first time offset is transmitted from the first comm device and received at a second comm device. A second time offset between the first comm device and the second comm device is determined. Navigation signals are received with a second navigation receiver to determine position of the second receiver. A third time offset between a second navigation time mark and a second comm time mark from the second comm device is determined. The third time offset is transmitted from the second comm device to the first comm device. A first navigation receiver clock to a second navigation receiver clock time offset is computed from the first time offset, the second time offset, and the third time offset. The first navigation receiver clock to second navigation receiver clock time offset is used in differential position calculations at the first navigation receiver.

The method of improving accuracy in a differential navigation system by time transfer with a communications link further comprises comparing the position of the second receiver to a known position of the second navigation receiver and determining differential correction signals and transmitting the correction signals to the first navigation receiver with the second comm device. The step of determining the second time offset further comprises performing a time transfer measurement between the first comm device and the second comm device. The first navigation receiver to second navigation receiver time offset is used for improving horizontal or vertical position accuracy.

It is an object of the present invention to provide a high-precision time transfer capability using communication systems to improve accuracy in a differential navigation system.

It is an object of the present invention to significantly improve accuracy for differential navigation system operation using high-precision time transfer across a two-way communication link, It is an advantage of the present invention to use a two-way communications link, which in addition to serving as the differential data link, is being used as an auxiliary sensor.

It is an advantage of the present invention to provide significant accuracy improvements with poor satellite geometries.

It is a feature of the present invention to extend satellite navigation capability into more challenging operational environments.

It is a feature of the present invention to extend to applications in other satellite navigation systems and ground based two-dimensional systems.

BRIEF DESCRIPTION OF THE DRAWINGS

The invention may be more fully understood by reading the following description of the preferred embodiments of the invention in conjunction with the appended drawings wherein.

DETAILED DESCRIPTION

The present invention is for a method and apparatus for communications link time transfer to improve positioning accuracy in a differential navigation system. A high-precision time transfer method uses an independent two-way communication link for time transfer from a reference station to achieve nanosecond-level relative timing accuracy. Improved relative clock error in an aircraft or other remote station with respect to the reference station reduces dilution of precision (DOP) and improves positioning accuracy.

The present invention is applicable to but not limited to GNSS, GPS, and other passive ranging navigation systems such as Loran. The present invention is applicable to future navigation systems that use non-navigation signals of opportunity. The present invention is described herein in terms of a GPS system and specifically a differential GPS (DGPS) system. The invention is described below for improving the vertical dilution of precision (VDOP) but may be used to improve any DOP.

Figure 1:
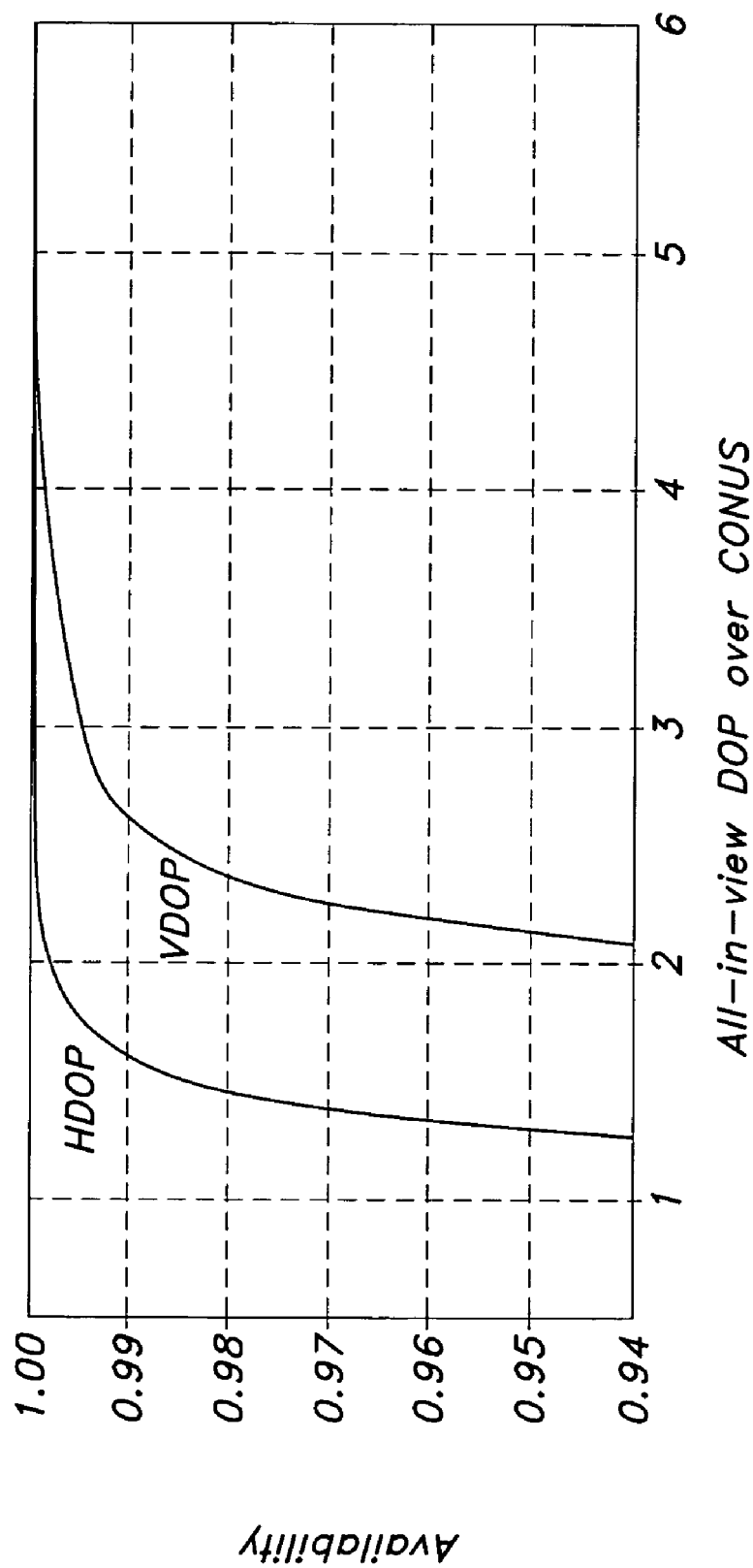
FIG. 1 illustrates all-in-view satellite dilution of precision over the continental US plotted against satellite availability.

GPS positioning accuracy is dependent on dilution of precision (DOP) with VDOP being generally poorer than horizontal dilution of precision (HDOP) due to strong coupling between vertical error and clock error. FIG. 1 shows all-in-view satellite DOP over the continental US (CONUS) plotted against satellite availability. As can be seen HDOP is better than VDOP at reduced satellite availability. It has been shown that clock uncertainty plays a big role in the vertical component of the satellite geometry and that VDOP can be vastly improved if clock biases are minimized or eliminated (P. Misra, M. Pratt, B. Burke, and R. Ferranti, "Adaptive Modeling of Receiver Clock for Meter-Level DGPS Vertical Positioning," in *Proceedings of the Institute of Navigation GPS 1995*, Palm Springs, Calif., September, 1995). Misra et al. showed that the use of clock aiding, such as from a highly stable clock following accurate calibration, reduces the uncertainty of the clock state, one of four minimum states required for the three-dimensional solution of GPS. All of this early work on clock aiding to improve the vertical geometry was devoted to the need for an atomic timing standard, something that was esoteric for that point in time. Currently, while the idea of a chip-scale rubidium standard is not expected to be as daunting, the idea of using a near-perfect clock still presents some operational issues, particularly for high-integrity operations. An alternative way to deliver the capability of clock aiding is needed.

Differential GPS concepts are at the core of high-accuracy and integrity applications. Carrier-smoothed code DGPS can now attain sub-meter ranging accuracies and depends greatly on satellite geometry to achieve the desired positioning accuracies. Carrier phase differential systems can achieve centimeter-level accuracies, but are even more reliant on strong satellite geometry for integer cycle ambiguity resolution. Clock aiding, but with a different mechanism than those known in the art and for an even wider scope of applications is provided by the current invention.

The role of aiding with an atomic frequency standard has been envisioned to be solely for improving standalone positioning accuracy and principally in the vertical dimension. In this context, the need for a highly-accurate clock was for maintaining the receiver timing to be as close to the GPS system time as possible. Applying clock aiding to DGPS in the present invention is different in that accurate absolute time is not required but rather accurate relative time between a differential reference station receiver and a remote receiver.

There are various mechanizations of differential GPS and other navigation systems but the underlying concepts for all mechanizations involve solving for a relative position baseline between the reference station and the remote receiver. The solution of that baseline is dependent on the same geometry (dilution of precision or DOP) factors as for standalone GPS.

Figure 2:
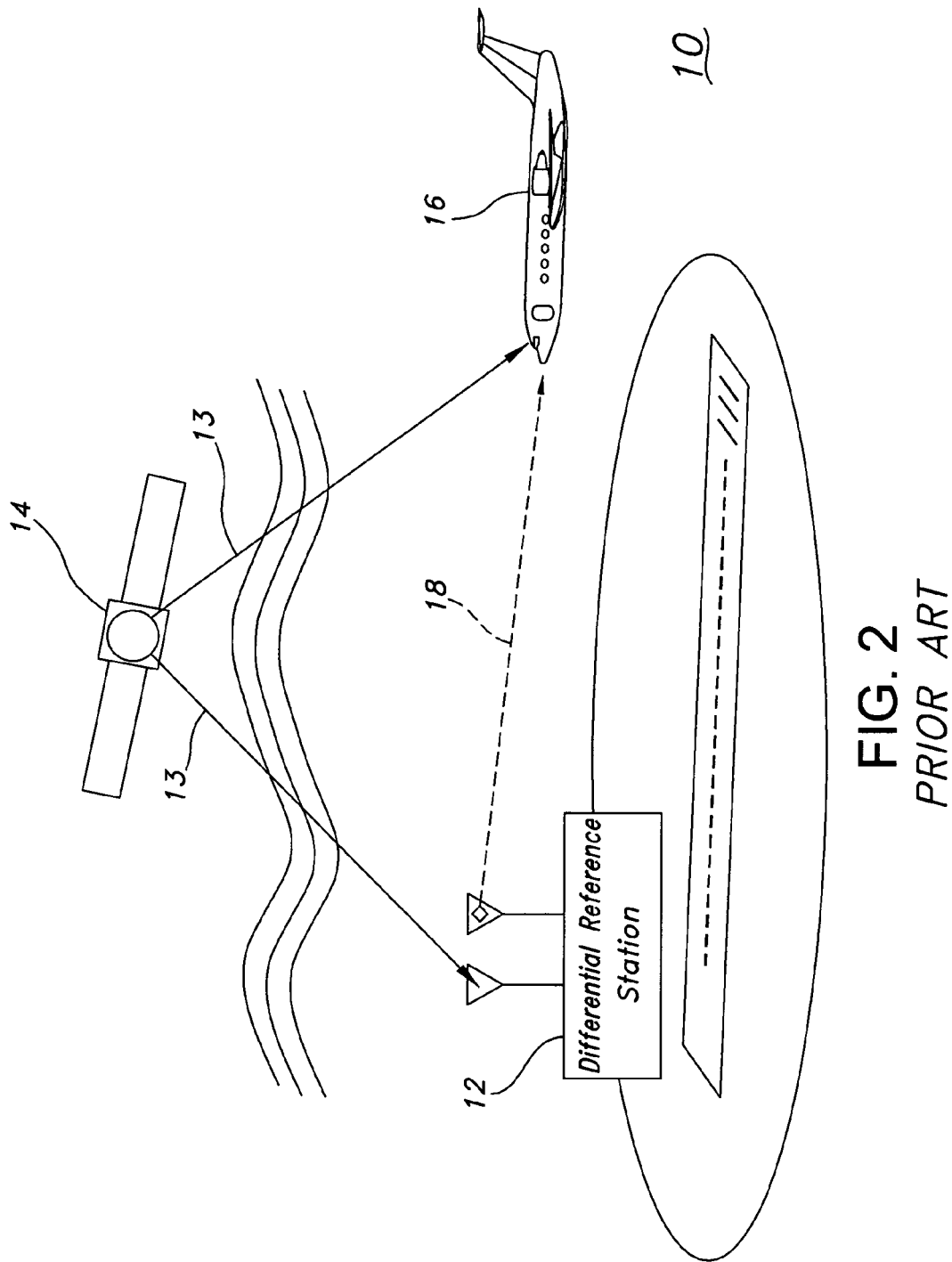
FIG. 2 is a diagram of a differential GPS system known in the art.

A differential GPS system 10 known in the art is shown in FIG. 2. A GPS satellite 14 transmits GPS signals 13 that are received by a differential reference station 12 located at a precisely known or surveyed position. Only one GPS satellite 14 is shown but typically four or more are used in position determination. The GPS signals 13 are also received by a mobile or remote user such as an aircraft 16. An aircraft 16 is shown in FIG. 2 but the remote user 16 may be any air, water, or land based vehicle or an individual equipped with a GPS receiver. The differential reference station 12 compares its position determined from the GPS signals 13 from several GPS satellites to the predicted measurements for a precisely known position and determines corrections for the GPS signals 13 and transmits the corrections over a differential corrections communications link 18 to the aircraft 16. The communications link 18 may be a one-way broadcast-only data link. The aircraft 16 determines its position from the GPS signals 13 it receives and applies the corrections received from the differential reference station 12 over the communications link 18 to arrive at a more accurate position determination for the aircraft 16.

Figure 3:
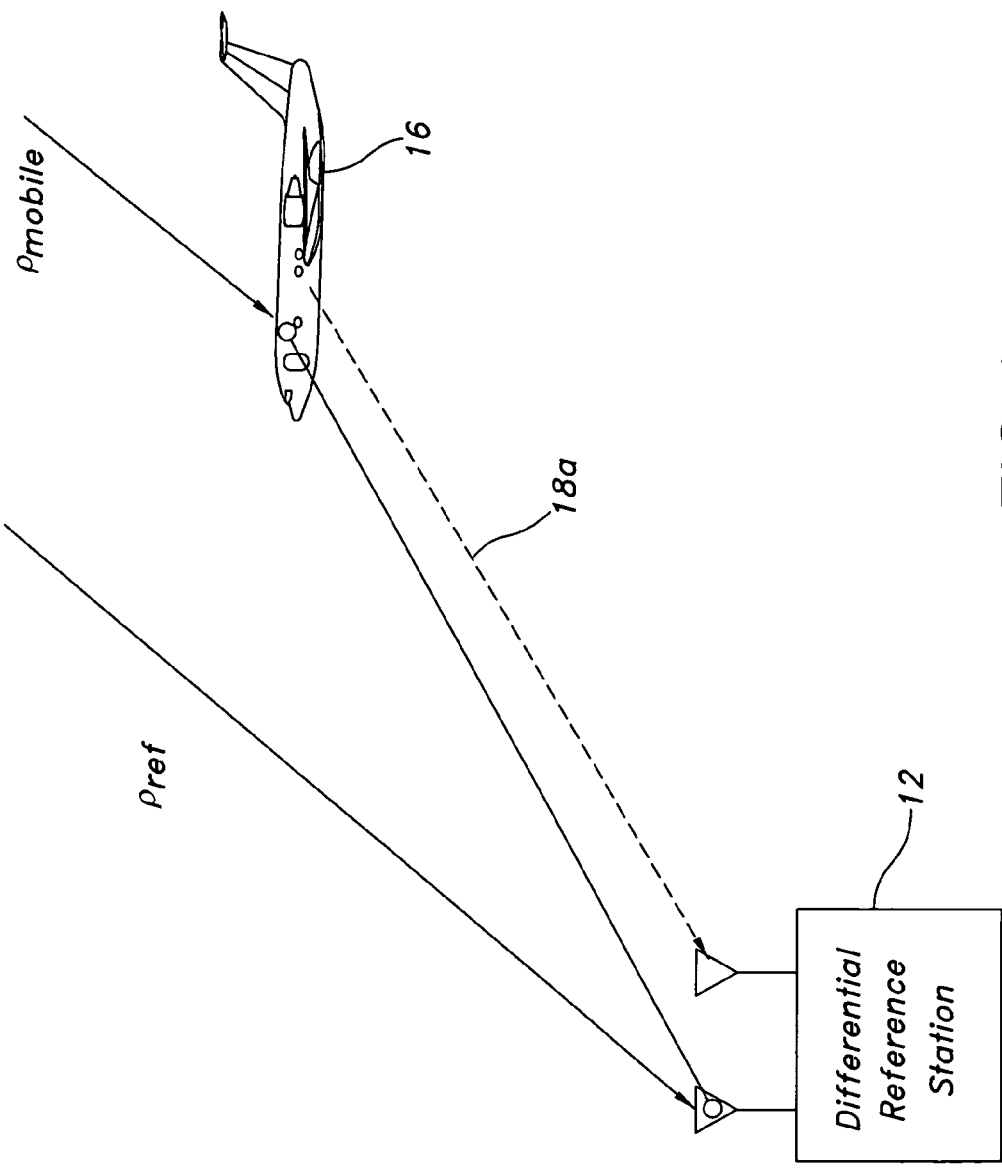
FIG. 3 is a diagram showing detail of a differential GPS system with a two-way communications link.

Referring now to FIG. 3, the reference station 12 makes pseudorange measurements $\rho_{ref}$ to the GPS satellites. The remote user such as the aircraft 16 makes pseudorange measurements $\rho_{mobile}$ to the satellites. The basic problem in DGPS applications is to solve for four states: three relative position states ($\Delta x$, $\Delta y$, and $\Delta z$), and one relative clock error state ($\Delta t$). Often, double difference techniques are used to eliminate the relative clock state from the estimation problem, but this does not change the basic geometric observability characteristics of the problem. The linearized measurement equations for DGPS position solutions are identical to those for standalone GPS as presented below:

$$\begin{bmatrix} \Delta\rho_1 \\ \vdots \\ \Delta\rho_n \end{bmatrix} = \underbrace{\begin{bmatrix} h_{x1} & h_{y1} & h_{z1} & 1 \\ \vdots & & & \vdots \\ h_{xn} & h_{yn} & h_{zn} & 1 \end{bmatrix}}_{H} \begin{bmatrix} \Delta x \\ \Delta y \\ \Delta z \\ \Delta t \end{bmatrix} + \begin{bmatrix} \eta_1 \\ \vdots \\ \eta_n \end{bmatrix} \qquad \text{Equation 1}$$

where $\Delta\rho_i = \rho_{mobile,i} - \rho_{ref,i}$ and $\eta_1, \ldots \eta_n$, are the pseudorange errors. The RMS of the DGPS pseudorange errors is $\sigma$, where, without loss of generality, all DGPS measurements are assumed to have the same error level. The solution accuracy is determined by these measurement error levels and the satellite geometry contained in H where the terms $h_{xi}$, $h_{yi}$, and $h_{zi}$ make up a matrix of directional cosines to the satellites.

The present invention concept augments the usual set of DGPS measurements with a time transfer measurement of the relative time error between the remote user 16 and the reference station 12, denoted as $z_{TT}$, over a two-way communications link 18a (see FIG. 3). The time transfer measurement modifies the DGPS position solution equations in Equation 1 to be:

$$\begin{bmatrix} \Delta\rho_1 \\ \vdots \\ \Delta\rho_n \\ \hline z_{TT} \end{bmatrix} = \underbrace{\begin{bmatrix} h_{x1} & h_{y1} & h_{z1} & 1 \\ \vdots & & & \vdots \\ h_{xn} & h_{yn} & h_{zn} & 1 \\ \hline 0 & 0 & 0 & 1 \end{bmatrix}}_{H} \begin{bmatrix} \Delta x \\ \Delta y \\ \Delta z \\ \Delta t \end{bmatrix} + \begin{bmatrix} \eta_1 \\ \vdots \\ \eta_n \\ \hline \eta_{TT} \end{bmatrix} \quad \text{Equation 2}$$

With the present invention, instead of only a DGPS correction broadcast from the reference station 12 on the differential corrections communications link 18, the two-way communication link 18a in FIG. 3 is used between the remote user 16 and the reference station 12 to compute the two-way time transfer. This time transfer is achieved by accurate two-way or round-trip time synchronization with the two-way communication link 18a between the reference base station 12 and the remote user 16. Normal DGPS corrections are also broadcast on the two-way communications link 18a.

Figure 4:
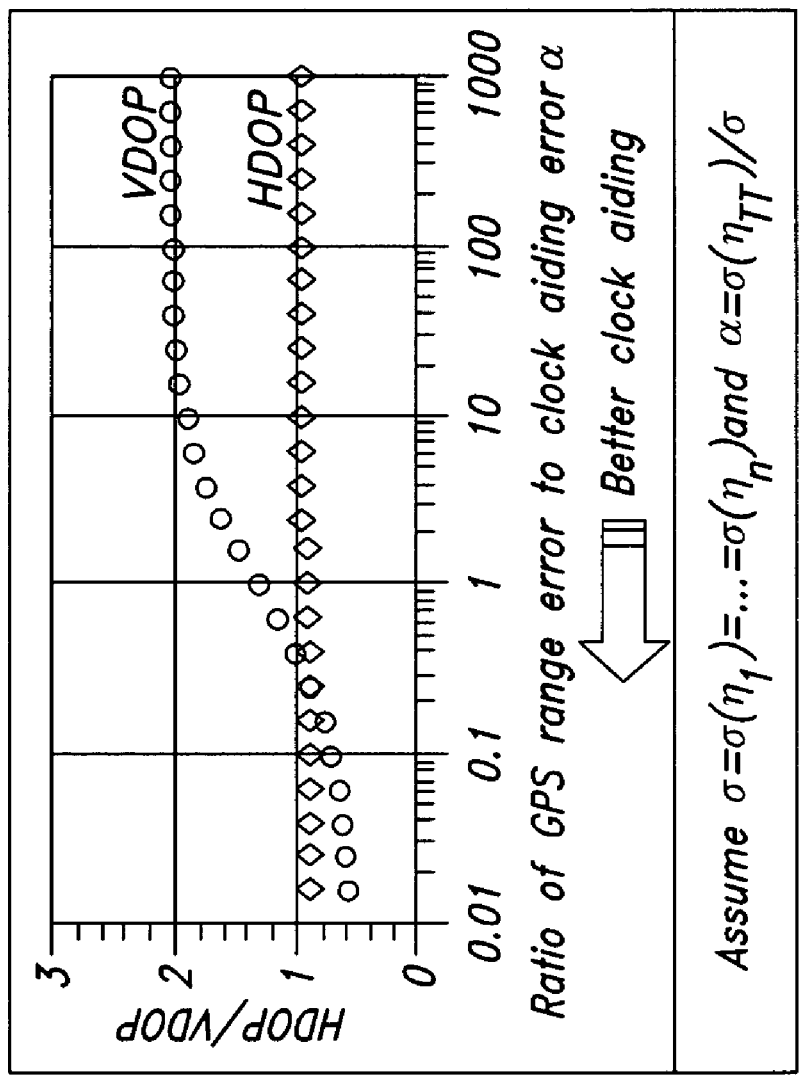
FIG. 4 demonstrates accuracy variation of a typical six-satellite geometry situation as a function of clock aiding.

To assess the contribution of the clock aiding measurement $z_{TT}$, a ratio of the measurement error for $z_{TT}$ to that for the pseudorange difference, $\Delta_\rho$, is defined as $$\alpha = \frac{\sigma_{TT}}{\sigma} \quad \text{Equation 3}$$

where $\sigma_{TT}$ is a time transfer error. Evaluating the modified DOP for a typical six-satellite geometry situation as a function of this ratio, a notable improvement in the VDOP is seen as $\alpha$ becomes small and the clock aiding becomes more prominent as shown in FIG. 4. In the plot of FIG. 4, $\alpha \to \infty$ represents no clock aiding while $\alpha \to 0$ represents perfect clock aiding, but normally $\alpha$ is in between these extremes.

Previous concepts to enhance measurement geometry considered use of a ranging source at the reference station 12. There are two basic reasons to use the two-way comm link 18a to provide timing measurements instead of ranging measurements. The first is geometry. If the two-way comm link 18a provides ranging measurements, the DGPS position solution in Equation 1 can be written as:

$$\begin{bmatrix} \Delta\rho_1 \\ \vdots \\ \Delta\rho_n \\ \hline z_{TR} \end{bmatrix} = \begin{bmatrix} h_{x1} & h_{y1} & h_{z1} & 1 \\ \vdots & & & \vdots \\ h_{xn} & h_{yn} & h_{zn} & 1 \\ \hline h_{xR} & h_{yR} & h_{zR} & 1 \end{bmatrix} \begin{bmatrix} \Delta x \\ \Delta y \\ \Delta z \\ \Delta t \end{bmatrix} + \begin{bmatrix} \eta_1 \\ \vdots \\ \eta_n \\ \hline \eta_{TR} \end{bmatrix} \quad \text{Equation 4}$$

Comparing Equation 4 with Equation 2 shows that geometry enhancement with ground-based ranging depends heavily on the relative geometry of the remote unit 16 and the reference station 12. In many instances, the ranging geometry may provide no benefit in the vertical component, which as discussed above, is typically the weakest in GPS.

Figure 5:
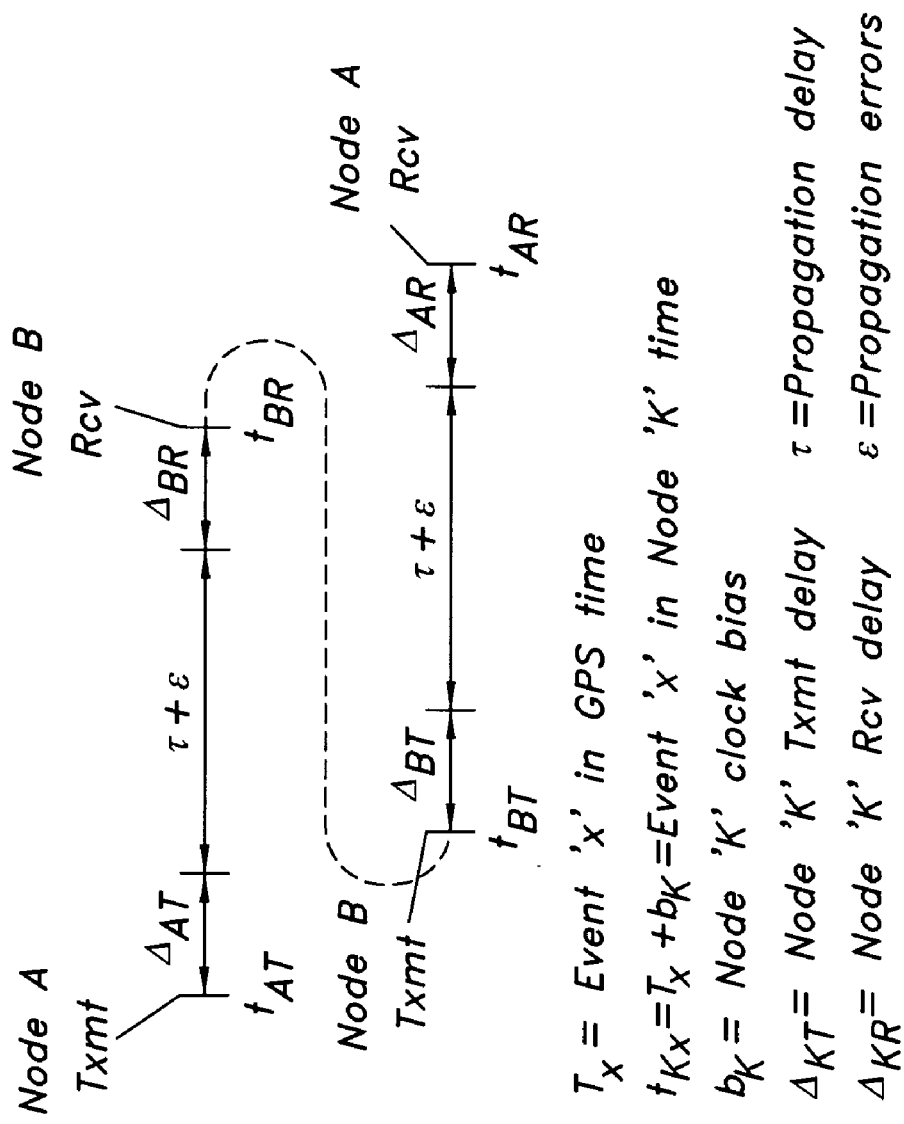
FIG. 5 shows a two-way messaging sequence for ranging and time transfer.

The other reason why time transfer is superior to comm link ranging in differential applications is that there are a number of error sources associated with ranging that are not present with time transfer. This can be demonstrated with a two-way messaging sequence depicted in FIG. 5. Messages are exchanged between two nodes, A and B, and the times of transmission and reception are measured at modems in their respective time scales. The messages may be of any type or simply pulses for timing purposes. The node times are offset from true system time by clock biases that are assumed for simplicity to be constant over the two-way messaging interval. Furthermore, as illustrated in FIG. 5, there are transmit and receive modem delays associated with each node as well as common-mode propagation errors (multipath, troposphere, others). The propagation errors are assumed constant, but this assumption can also be relaxed.

The line-of-sight range measurement, can be determined from the transmit and receive times as $$z_{TR} = \frac{c}{2}[(t_{BR} - t_{AT}) + (t_{AR} - t_{BT})] \quad \text{Equation 5}$$

$$= c\left[\tau + \varepsilon + \frac{1}{2}(\Delta_{AT} + \Delta_{BR} + \Delta_{BT} + \Delta_{AR})\right]$$

The time transfer measurement between the two nodes is computed as $$z_{TT} = \frac{c}{2}[(t_{AR} - t_{BT}) + (t_{BR} - t_{AT})] \quad \text{Equation 6}$$

$$= c\left[b_A - b_B + \frac{1}{2}(\Delta_{AR} - \Delta_{AT} + \Delta_{BT} - \Delta_{BR})\right]$$

Comparing Equation 5 and Equation 6 shows a number of significant differences. To obtain accurate ranging measurements, the front end transmit and receive delays of the radios (that are by definition positive) must be very well calibrated. This calibration is not always easy to do reliably to the accuracies desired here and the delays are subject to change with temperature and other factors. On the other hand the delays tend to cancel for time transfer measurements. For example, if the transmit and receive delays for a given node are equal, then they cancel. Similarly, if the two nodes A and B are identical, then again the modem delays cancel. Common mode propagation errors, such as troposphere delay, also are eliminated in the time transfer formulation, while directly affecting ranging. Since a typical tropospheric delay amounts to 30 cm per kilometer of range, this is a very significant error that must be corrected for when generating ranging measurements.

This comparison of accuracy for time transfer and ranging highlights how much easier it is to implement time transfer than ranging, because the need for precise calibration of the modems and propagation environment is avoided. This is an important issue for practical implementations.

Figure 6:
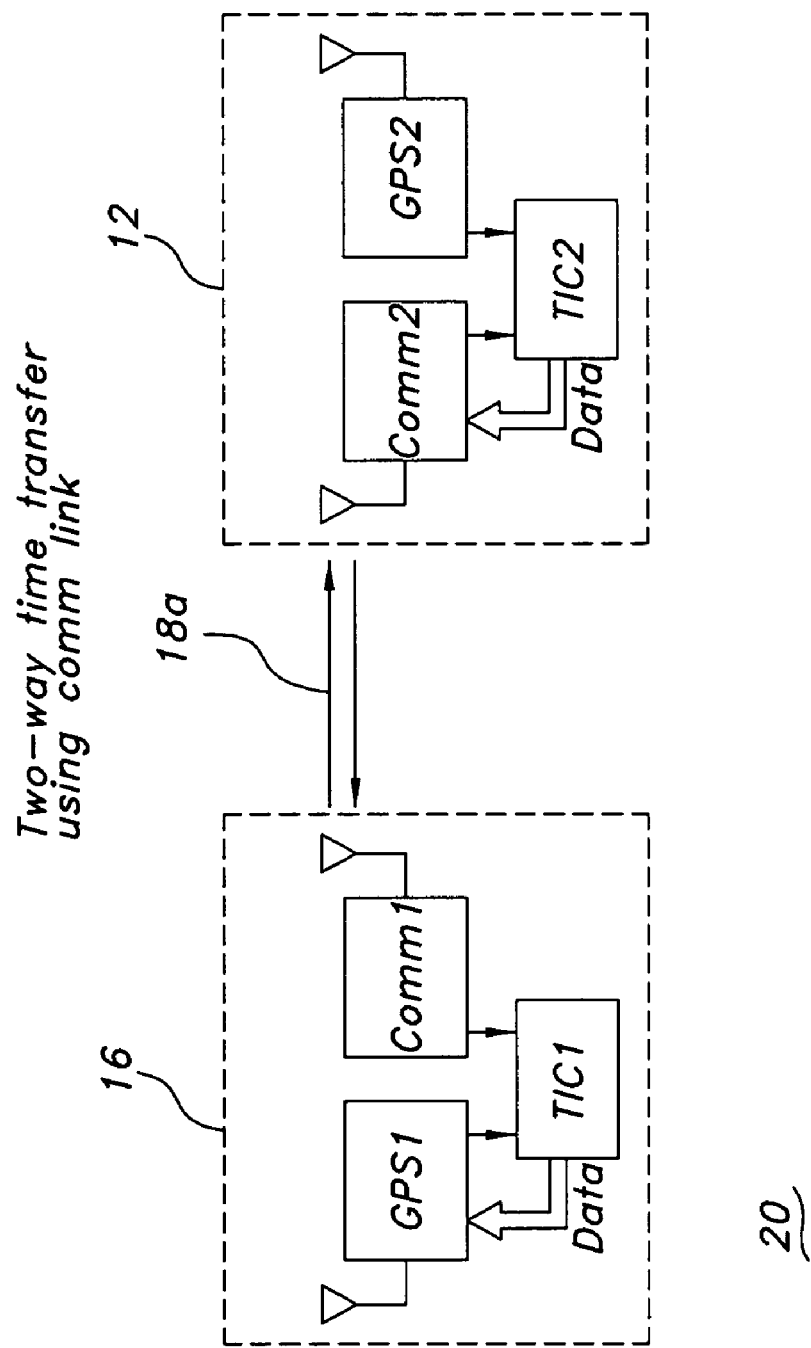
FIG. 6 is a diagram of the present invention for precision time transfer using a communications link two-way time transfer system.

The present invention for time transfer to improve navigation system accuracy is accomplished by a communications link two-way time transfer system 20 as shown in FIG. 6. The communications link 18a may be of any form suitable for two-way time transfer such as a radio communications link or an optical communications link. Communications devices Comm 1 and Comm 2 may be radio transceivers or optical transceivers.

In FIG. 6, the remote user 16 comprises a first comm device Comm 1, a first navigation receiver GPS 1, and a first time interval counter TIC 1. The differential reference station 12 comprises a second comm device Comm 2, a second navigation receiver GPS 2, and a second time interval counter TIC 2. The two-way time transfer is made between the comm devices Comm 1 and Comm 2 over the two-way time transfer comm link 18a.

Each comm device Comm 1 and Comm 2 provides a precise comm time mark for synchronization to its companion navigation receiver, GPS 1 and GPS 2 respectively. Similarly, navigation receivers GPS 1 and GPS 2 output precise navigation time marks that correspond with the measurements the navigation receivers generate. In a GPS system, measurements can be generated by a GPS receiver clock-based 1-Hz epoch or they can be generated on the GPS 1-Hz epoch. The synchronization is accomplished by comparing the navigation time marks and the comm time marks using the time interval counters (TIC 1 and TIC 2) capable of making subnanosecond level resolution measurements. The TIC 1 and TIC 2 measurements are conveyed as data outputs to GPS 1 and Comm 2 respectively.

Figure 7:
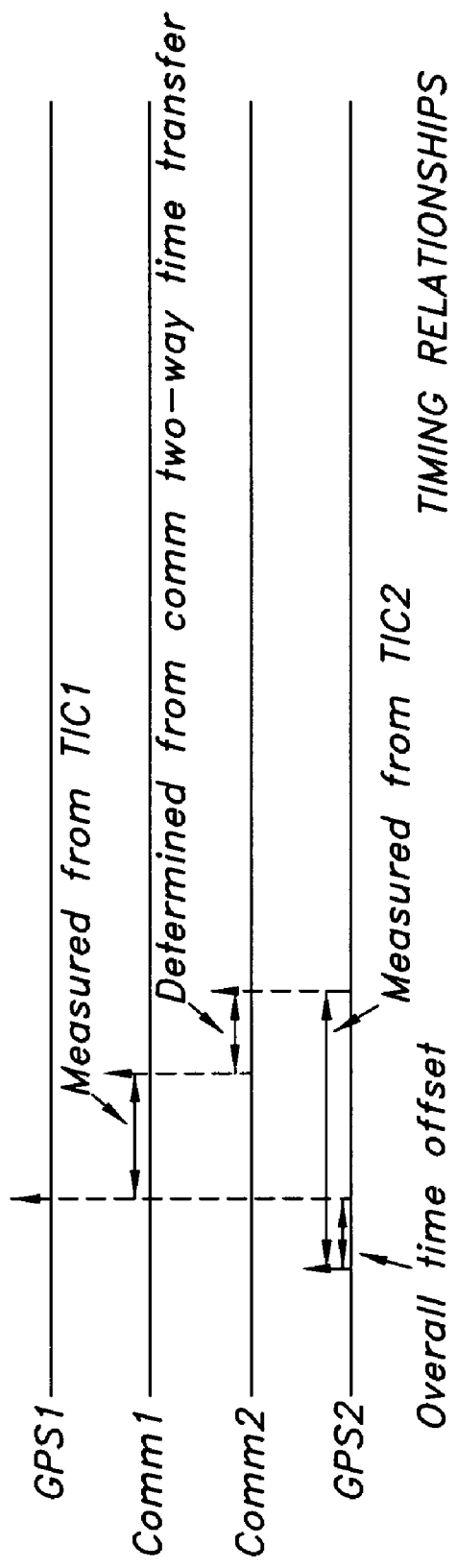
FIG. 7 shows the relative timing relationships of the system of FIG. 6.

FIG. 7 shows the relative timing relationships of the system 20 of FIG. 6. The relative timing relationships are between the four independently-clocked components, GPS 1, Comm 1, GPS 2 and Comm 2. Three relative timing measurements, made between the two comm devices (Comm 1 and Comm 2) and each comm device and its associated navigation receiver (Comm 1 and GPS 1 and Comm 2 and GPS 2), allows for the determination of the relative timing between the two navigation receivers GPS 1 and GPS 2.

The first navigation receiver GPS 1 receives and processes navigation (GPS) signals and provides a first navigation time mark to the first time interval counter TIC 1. TIC 1 also receives a first comm time mark from the first comm device Comm 1. TIC 1 determines a first time offset between GPS 1 clock time and Comm 1 time and supplies time correction data to GPS 1. A second time offset between Comm 1 and Comm 2 is determined from a two-way time transfer between Comm 1 and Comm 2 as discussed in conjunction with FIG. 5 where Node A becomes Comm 1 and Node B becomes Comm 2 and $t_{AT}$ is Comm 1 transmit time in Comm 1 time, $t_{BR}$ is Comm 2 receive time in Comm 2 time, $t_{BT}$ is Comm 2 transmit time in Comm 2 time, and $t_{AR}$ is Comm 1 receive time in Comm 1 time. Comm 2 receive time, $t_{BR}$, and Comm 2 transmit time, $t_{BT}$, are transmitted from Comm 2 to Comm 1. The time offset between Comm 1 and Comm 2, $z_{TT}$, is computed as shown by Equation 6.

The second navigation receiver GPS 2 receives and processes navigation (GPS) signals and provides a second navigation time mark to the second time interval counter TIC 2. TIC 2 also receives a second comm time mark from the second comm device Comm 2. TIC 2 determines a third time offset between GPS 2 and Comm 2 that is then transmitted over the comm link to Comm 1. All three time offsets are used to compute an overall GPS 1 to GPS 2 time offset to use in clock aiding of GPS 1 as shown in the FIG. 7 timing relationships. The GPS 1 to GPS 2 time offset is used as an input in Equation 2 as the clock aiding measurement $z_{TT}$ in the GPS 1 receiver processing.

Though not shown in FIG. 7, one complication that arises in this scheme is due to clock frequency error for temperature compensated crystal oscillator (TCXO) quality clocks, especially if the relative time intervals (shown by the top three two-headed arrows in FIG. 7) are more than a few milliseconds long. Since the relative timing relationships ideally depicted in FIG. 7 are not established instantaneously, such clock drifts may contribute significant error if they are not properly accounted for as discussed below.

Figure 8:
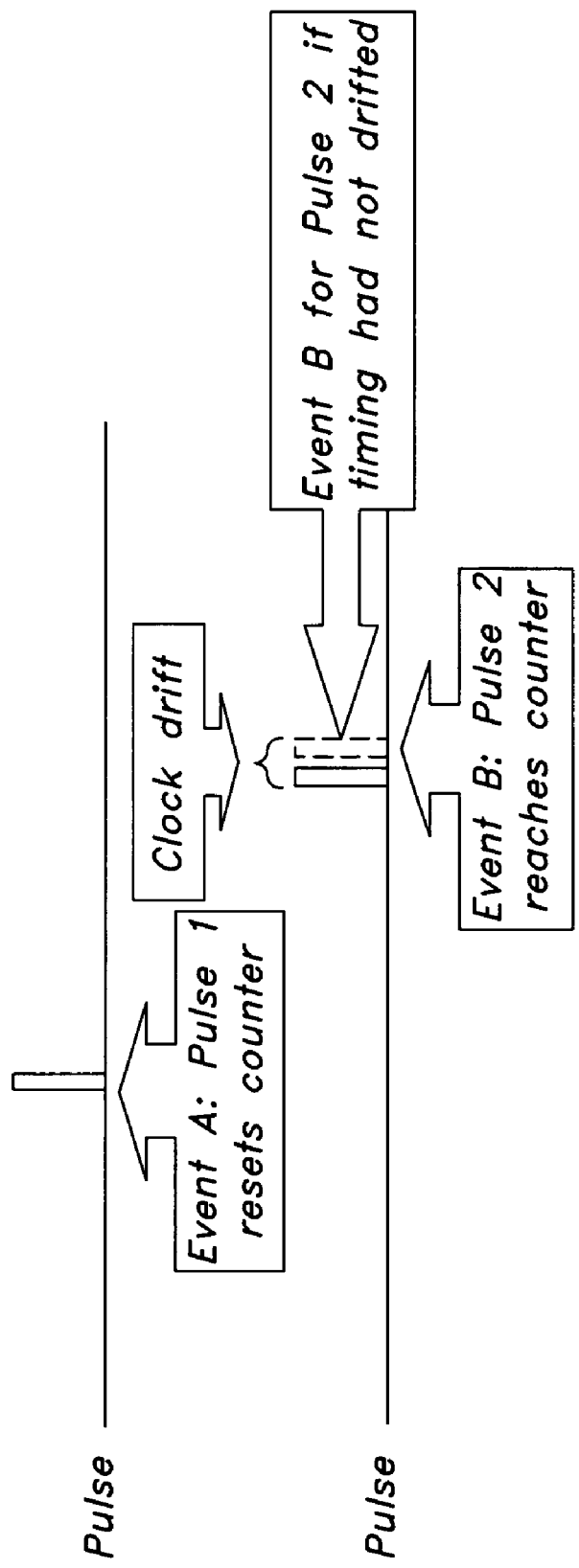
FIG. 8 illustrates time interval counter operation.

Time interval counter (TIC 1 and TIC 2) operation is shown in FIG. 8. The time interval measurement compares arrival of two pulses, pulse 1 and pulse 2, over a fairly long duration (1-2 seconds) but measures a time difference to a very high resolution (<1 ns). Clock drift in pulse 2 in the example shown in FIG. 8 must be accounted for to properly establish the instantaneous time difference between events. If unaccounted, TCXO stability (1 part in $10^7$) causes drifts of 15 meters rms over ½ sec. Clock drift may be derived from the navigation (GPS) solution, but for robustness, the solution avoids dependency on GPS but estimates it from successive pulse pairings.

In practice, the TIC function is unnecessary as an explicit function as shown in FIGS. 6 and 7. The TIC function may be embedded in comm devices (Comm 1 and Comm 2), may be embedded in the navigation receivers (GPS 1 and GPS 2), or may be eliminated entirely. The TIC function is simply a means to enable time transfer between the navigation receivers (GPS 1 and GPS 2) and the comm devices (Comm 1 and Comm 2) and does so by measuring the relationship of two specific events generated independently by the navigation receivers and the comm devices.

To avoid drift error from clocking of the TIC, the TIC functions may reside in the communications devices (Comm 1 and Comm 2) and share their clocking. Only the navigation (GPS) clocks are separate and need to be synchronized by time stamping their 1-Hz time mark against the comm device's timing count. The clock drift estimated represents the combined drift of the clocks between the navigation receivers GPS 1 and GPS 2 and the comm devices Comm1 and Comm 2. Many of the clock drift problems associated over relative long time intervals of a sizeable fraction of a second are eliminated.

In a fully integrated system where the navigation receivers and comm devices are running off the same coherent clocks, the TIC function can be eliminated and calibration is only needed once at initialization since the navigation receivers and comm devices will be operating in lock step after that.

Figure 9:
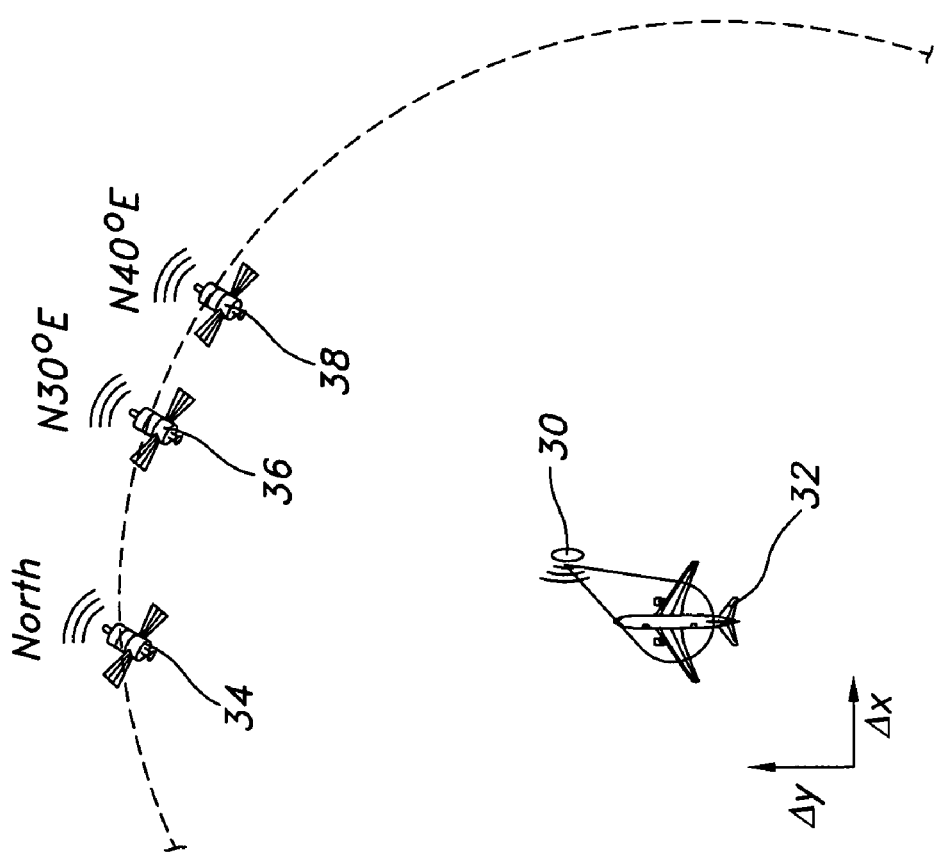
FIG. 9 shows how the present invention may be extended to a horizontal GPS geometry or for any generic two-dimensional navigation system that uses one-way ranging from multiple transmitters.

The present invention may be extended to a horizontal GPS geometry as well or for any generic radio navigation system that uses one-way ranging from multiple transmitters as shown in FIG. 9. Improvement is most dramatic for scenarios where transmitting stations are clustered as in FIG. 9. In FIG. 9 transmitters 34, 36, and 38 transmit one-way ranging signals received by a reference station 30 at varying azimuths. The situation is very different if any one of the transmitters is located 180 degrees in the opposite direction but such are the restrictive realities of operating conditions that exist in some challenging signal environments, especially in urban canyons. The reference station 30 transmits a differential correction signal $\Delta x$ to a remote user 32 to use in correcting its ranging signals received from transmitters 34, 36, and 38. With standard differential positioning, HDOP of $\Delta x$ may be 28.4 as shown below. With clock aiding from a communications link time transfer the HDOP of $\Delta x$ may be 2.3. The use of clock aiding from the present invention, with a measurement quality of $\alpha=1$, reduces the HDOP dramatically.

Without clock aiding:

$$\begin{bmatrix} \Delta \rho_1 \\ \Delta \rho_2 \\ \Delta \rho_3 \end{bmatrix} = \begin{bmatrix} -\sin 0° & -\cos 0° & 1 \\ -\sin 30° & -\cos 30° & 1 \\ -\sin 40° & -\cos 40° & 1 \end{bmatrix} \begin{bmatrix} \Delta x \\ \Delta y \\ \Delta t \end{bmatrix} + \begin{bmatrix} \eta_1 \\ \eta_2 \\ \eta_3 \end{bmatrix} \Rightarrow \begin{array}{c} HDOP \\ = 28.4 \end{array}$$

With clock aiding:

$$\begin{bmatrix} \Delta \rho_1 \\ \Delta \rho_2 \\ \Delta \rho_3 \\ z_{TT} \end{bmatrix} = \begin{bmatrix} -\sin 0° & -\cos 0° & 1 \\ -\sin 30° & -\cos 30° & 1 \\ -\sin 40° & -\cos 40° & 1 \\ 0 & 0 & 1 \end{bmatrix} \begin{bmatrix} \Delta x \\ \Delta y \\ \Delta t \end{bmatrix} + \begin{bmatrix} \eta_1 \\ \eta_2 \\ \eta_3 \\ \eta_{TT} \end{bmatrix} \Rightarrow \begin{array}{c} HDOP \\ = 2.3 \end{array}$$

assuming $\sigma(\eta_1)=\sigma(\eta_2)=\sigma(\eta_3)=\sigma(\eta_{TT})$.

It is believed that the two-way communications link time transfer method and apparatus to improve navigation system accuracy of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method of improving accuracy in a differential navigation system by time transfer with a two-way communications link comprising the steps of:
   receiving navigation signals with a first navigation receiver to determine navigation measurements at the first navigation receiver;
   receiving navigation signals with a second navigation receiver to determine navigation measurements at the second navigation receiver;
   determining a time transfer measurement of a time offset between the first navigation receiver and the second navigation receiver with a two-way communications link; and
   combining the navigation measurements at the first navigation receiver, the navigation measurements at the second navigation receiver, and the time transfer measurement to compute a differential position.

2. The method of improving accuracy in a differential navigation system by time transfer with a two-way communications link of claim 1 further comprising the steps of:
   determining a time offset between the first navigation receiver and a first communications device;
   determining a time offset between the second navigation receiver and a second communications device; and
   determining a time offset between the first communications device and the second communications device.

3. The method of improving accuracy in a differential navigation system by time transfer with a two-way communications link of claim 2 wherein the step of determining the time offset between the first communications device and the second communications device comprises the steps of:
   transmitting a first message from the first communications device at a first communications device transmit time;
   receiving the first message at the second communications device at a second communications device receive time;
   transmitting a second message from the second communications device at a second communications device transit time;
   receiving the second message at the first communications device at a first communications device receive time;
   transmitting the second communications device receive time and the second communications device transmit time to the first communications device;
   computing the time offset between the first communications device and the second communications device from the first communications device transmit time, the second communications device receive time, the second communications device transmit time, and the first communications device receive time.

4. The method of improving accuracy in a differential navigation system by time transfer with a two-way communications link of claim 1 further comprising the steps of:
   comparing the navigation measurements of the second navigation receiver to predicted measurements for a known position of the second navigation receiver and determining differential correction signals; and
   transmitting the differential correction data to the first navigation receiver.

5. The method of improving accuracy in a differential navigation system by time transfer with a two-way communications link of claim 1 wherein the first navigation receiver to second navigation receiver time offset is used for improving horizontal position accuracy.

6. The method of improving accuracy in a differential navigation system by time transfer with a two-way communications link of claim 1 wherein the first navigation receiver to second navigation receiver time offset is used for improving vertical position accuracy.

* * * * *